United States Patent
Ostrem et al.

[11] Patent Number: 5,933,514
[45] Date of Patent: Aug. 3, 1999

[54] METHOD FOR DYNAMIC RECONSTRUCTION OF HANDWRITTEN DATA

[75] Inventors: John S. Ostrem, Palo Alto; Norman A. Austin, Los Altos; Hewitt D. Crane, Portola Valley, all of Calif.

[73] Assignee: Communication Intelligence Corporation, Redwood Shores, Calif.

[21] Appl. No.: 08/605,972

[22] Filed: Feb. 23, 1996

Related U.S. Application Data

[63] Continuation of application No. 08/272,431, Jul. 7, 1994, abandoned, which is a continuation of application No. 07/932,453, Aug. 20, 1992, abandoned.

[51] Int. Cl.$^6$ .................................................. G06K 9/00
[52] U.S. Cl. ............................................ 382/122; 382/189
[58] Field of Search ................................. 382/119, 120, 382/121, 122, 123, 187, 189, 293, 276

[56] References Cited

U.S. PATENT DOCUMENTS

| | | | |
|---|---|---|---|
| 4,156,911 | 5/1979 | Crane et al. | 382/3 |
| 4,344,135 | 8/1982 | Crane et al. | 382/3 |
| 4,646,351 | 2/1987 | Asbo et al. | 382/3 |
| 4,901,358 | 2/1990 | Bechet | 382/13 |
| 5,040,222 | 8/1991 | Muroya | 382/3 |
| 5,077,802 | 12/1991 | Plamondon | 382/3 |
| 5,111,512 | 5/1992 | Fan et al. | 382/3 |
| 5,202,930 | 4/1993 | Livshitz et al. | 382/3 |
| 5,347,589 | 9/1994 | Meeks et al. | 382/13 |

OTHER PUBLICATIONS

Bruyne, P., "A New Method of Signature Verification", Proceedings of the 1977 International Conference on Crime Countermeasures, Jul. 1977, pp. 99–103.

Primary Examiner—Christopher S. Kelley
Attorney, Agent, or Firm—Townsend and Townsend and Crew LLP; Kenneth R. Allen

[57] ABSTRACT

A method is provided for reconstructing data generated on a digitizer tablet based on the dynamics of the data generation. The digitizer tablet samples the position of the writing pen, continuously transmitting data to a computer in the form of x and y coordinates plus an indicator of whether or not the pen is touching the surface of the tablet. After preprocessing, the data is reconstructed based on the dynamics of the data's creation. The values of the dynamic reconstruction are created by accumulating increments that are some function of the original data. To enhance the dynamics a nonlinear function is required.

17 Claims, 8 Drawing Sheets

*John S. Ostra*

METHOD FOR DYNAMIC RECONSTRUCTION OF HANDWRITTEN DATA

This is a Continuation of application Ser. No. 08/272,431 filed Jul. 7, 1994, now abandoned, which is Continuation of application Ser. No. 07/932,453, filed Aug. 20, 1992, now abandoned.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to data verification applications, and more specifically, to the dynamic reconstruction of a signature generated on a digitizer tablet.

The process of visually comparing signatures to check for forgeries is well-established. For example, banks have signature cards for their customers on file, and tellers can compare the signature on a check or other document with the signature card if there is any question as to the authenticity of the signature. In other instances it may be necessary to compare electronically generated signatures. This form of signature can be authenticated using either an automated, computer based verification system or by relying on human examiners.

In general, signature verification techniques rely on the static or "as written" image of the signature. Unfortunately, reliance on this form of the signature only provides a modicum of security since a skilled forger can often duplicate a static signature with sufficient accuracy to circumvent detection. Furthermore, it is normally quite easy to obtain static images of a person's signature, thus providing the would-be forger with all of the necessary information.

Digitizer tablets are known for data input applications. Typically, digitizer tablets are used for capturing primarily spatial and sequential information. When something is written on a digitizer tablet, the output is a parametric representation of the writing trajectory; that is, the writing is represented as a series of x, y coordinate values as a function of time. A typical digitizer tablet samples the position of the writing pen 100 times per second, at fixed intervals of 0.01 seconds. The tablet continuously transmits the resulting data to the receiving computer. Thus every 0.01 seconds, the tablet samples the pen position and transmits an x-coordinate value, a y-coordinate value, and an additional value which indicates whether the pen is up or down. Since the sampling occurs at uniform time intervals, the physical or spatial distance the pen travels between samples is proportionally larger where the writing is fast and proportionally smaller where the writing is slow. The velocity of writing is proportional to the distance travelled between sampled points. This feature may be applied to other data gathering functions.

What is needed is a method of dynamically reconstructing handwritten information, thereby providing a highly reliable technique for detecting a forgery.

SUMMARY OF THE INVENTION

According to the invention, a method is provided for reconstructing from stored data generated on a digitizer tablet a representation of the dynamics of the input based on the dynamics of the data generation. In a specific embodiment, values useful for dynamic reconstruction are created by accumulating increments of values that are some function of the original data values. To enhance the dynamics, a nonlinear function is preferred. For example, a suitable increment is the square of the spatial difference between samples in the original data. The resulting dynamic reconstruction would show the portions of the signature that are written relatively quickly to be proportionally stretched out, while the areas that are written relatively slowly would be compressed. A second example having the opposite effect is a reconstruction in which the increment is the reciprocal of the difference between the original data points. This function results in compression of fast writing and expansion or stretching of slow writing.

Although the choices for the processing function are limitless, the basis of a first specific embodiment of this invention is to accentuate the velocity component of the original handwritten data. Different functions simply result in different degrees of dynamic enhancement.

The dynamic reconstruction of data may be difficult to read or analyze since some areas of a signature will be expanded while other areas will be compressed, often resulting in an overlap. In another embodiment of the invention, space is added between the individual strokes of the handwritten data, thereby simplifying analysis. (Note: a "stroke" is defined as the continuous segment which begins when the pen touches the digitizer tablet's surface and ends when the pen is lifted from the surface.) By spacing out the strokes, overlapping can be prevented. Spacing out the strokes has the added advantage of clearly displaying the stroke sequence with which the original signature was written. Therefore a forgery can be detected by noting an improper stroke sequence; for example, at what point in a signature a "t" is crossed or an "i" is dotted.

In application, dynamic reconstruction can either be used singularly, or in conjunction with conventional forgery detection techniques. It is a highly effective signature verification technique since a would-be forger must not only reproduce the static image of a signature, but also must simultaneously reproduce the dynamic image of the signature. The forger's job is further complicated by the difficulty associated with obtaining accurate information regarding signature dynamics. Thus, unless a forger is able to reproduce the forces and motions used to generate a signature, even a highly accurate static tracing would be detectable.

In a typical application, the verification process would be performed by comparing a specimen signature generated by the person desiring to be authenticated with a stored reference signature known to belong to the person. Reference signatures can be stored in hard copy or in computer storage. In the preferred embodiment, the static image and the dynamic reconstruction of the specimen signature would be displayed on a CRT computer screen next to the appropriate reference signatures. The examiner would then compare the images on the CRT screen and determine if the specimen signature is authentic.

The term "signature," as used herein in the specification and the claims, is not meant to be limited to the name of a person. Any sequence of words, characters, or symbols can be processed by this invention and are intended to be within the meaning of the term.

DESCRIPTION OF THE SPECIFIC EMBODIMENT(S)

Figure 1:
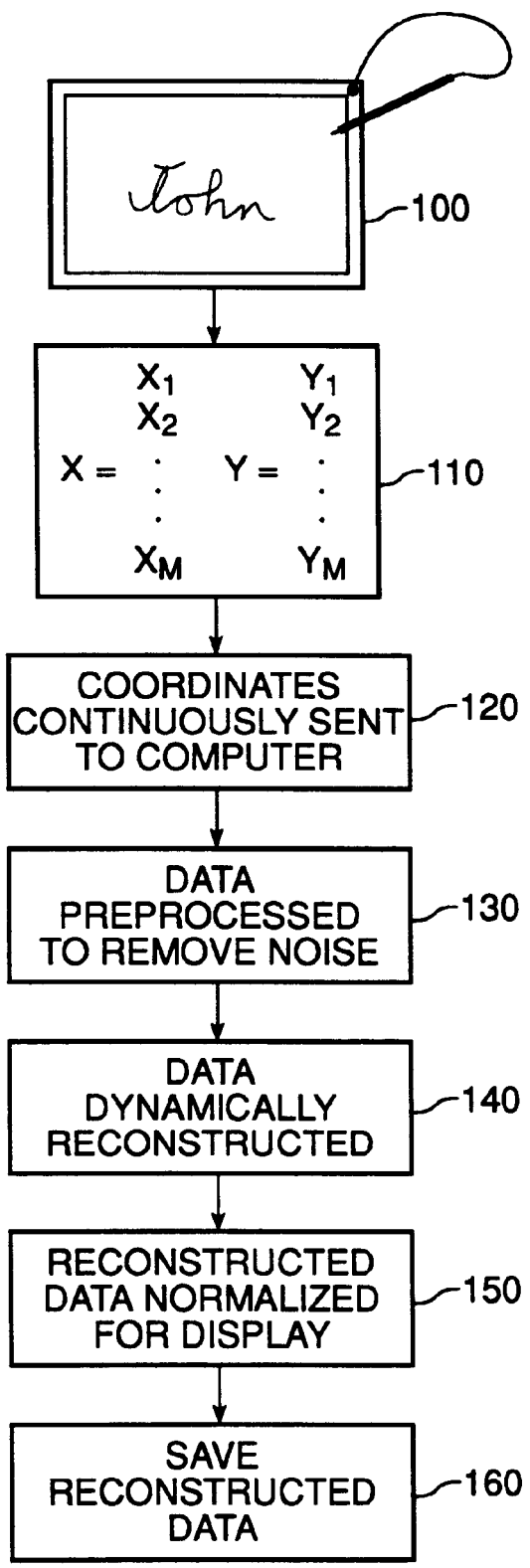
FIG. 1 is a flow chart of the general dynamic reconstruction method according to the invention.

The flow chart of FIG. 1 illustrates the dynamic reconstruction method described by this invention. Data is input by applying a scribing instrument to the surface of a position-sensitive digitizer tablet which correlates position with time by means of a sampling technique (step 100). The tablet presents the resultant writing as a series of x and y coordinate values as a function of time (step 110). This stream of x,y position coordinates along with a pen up/pen down indicator for each coordinate pair is continuously sent to a computer (step 120) for temporary storage and for further processing.

In the preferred embodiment, prior to dynamic reconstruction, the data is preprocessed (step 130). The exact form of preprocessing will vary according to the application and system. Preprocessing is generally used to remove noise and can be accomplished with any number of smoothing or filtering techniques. Details are unimportant as long as a good representation of the written input data is maintained.

In general, a mathematical function can be used to describe the process which is applied to each data element of every data point; namely, a function for enhancing the dynamics associated with the generation of the data (step 140). This function can be any appropriate function which achieves the desired dynamic enhancement. In the most general form, this function can be expressed as:

$$X_i = X_{i-1} + f_x(\{x_i, y_i : i=0, N-1\}),$$

and $$Y_i = Y_{i-1} + f_y(\{x_i, y_i : i=0, N-1\})$$

where $x_i$ and $y_i$ over the range i=0 to i=N−1 is the discrete representation of a stroke, $X_i$ and $Y_i$ over the range i=0 to i=N−1 is the discrete representation of a dynamic reconstruction of a stroke, N is the number of points, and $f_x$ and $f_y$ are appropriately chosen functions to achieve the desired dynamic enhancement.

After applying the process, the dynamically reconstructed data points are normalized (step 150) and saved (step 160) for later comparison.

Figure 2:
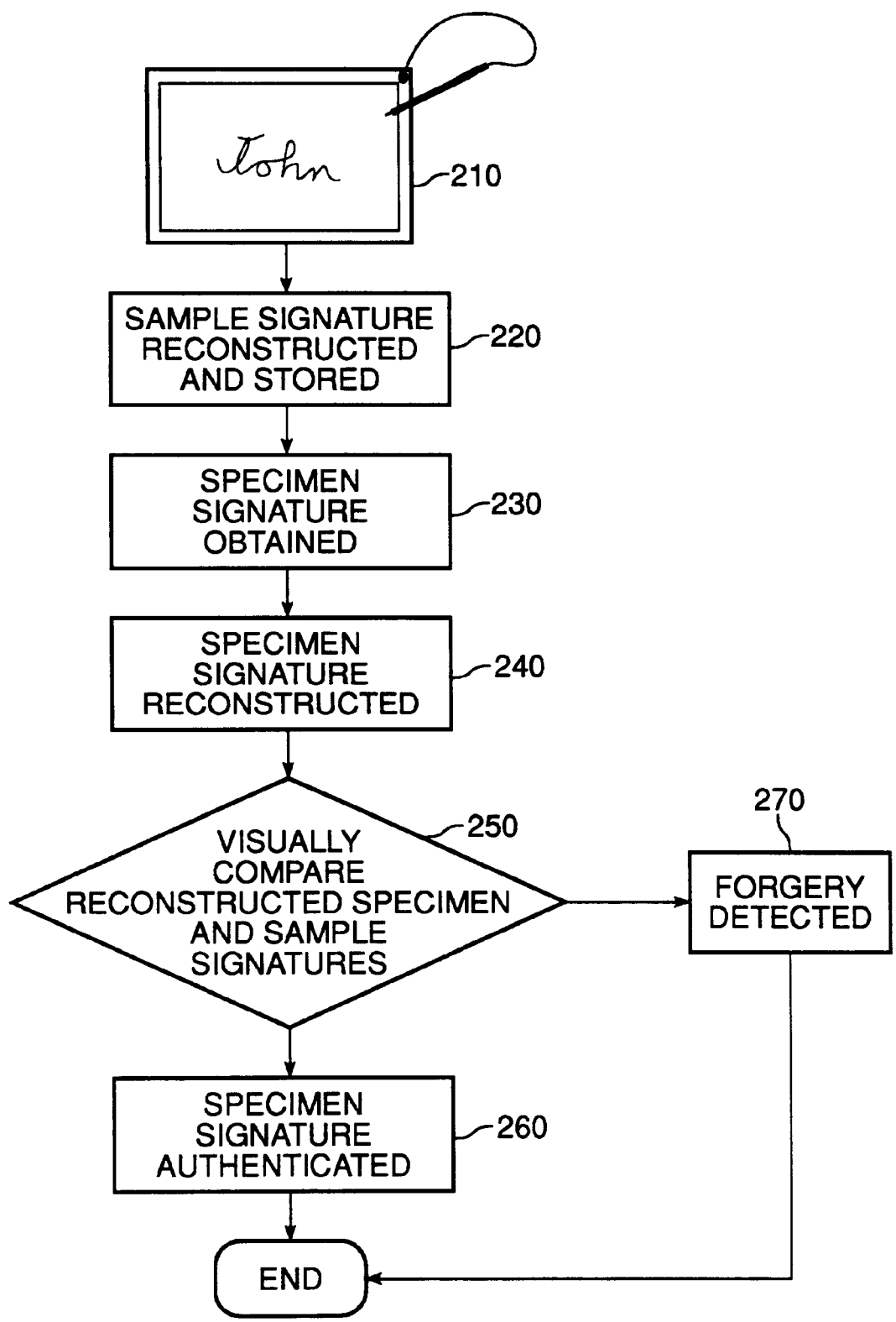
FIG. 2 is a flow chart illustrating a potential application of the invention.

FIG. 2 is a flow chart illustrating a potential application of the invention. Initially, an individual generates a signature on a digitizer pad (step 210), creating data for processing. This data is dynamically reconstructed and stored in accordance with the invention (step 220). Later, when the authenticity of the individual who created this signature is to be verified, the individual is asked to generate a specimen signature, once again using a digitizing pad (step 230). This specimen signature is then dynamically reconstructed using the same function as applied to the original sample signature (step 240) and compared to the archived original signature (step 250). At this point the authenticity of the specimen signature is either verified (step 260), or the specimen signature is determined to be a forgery (step 270) based on a visual comparison of a display of the dynamic reconstruction of the archived signature and of the specimen signature.

Figure 3:
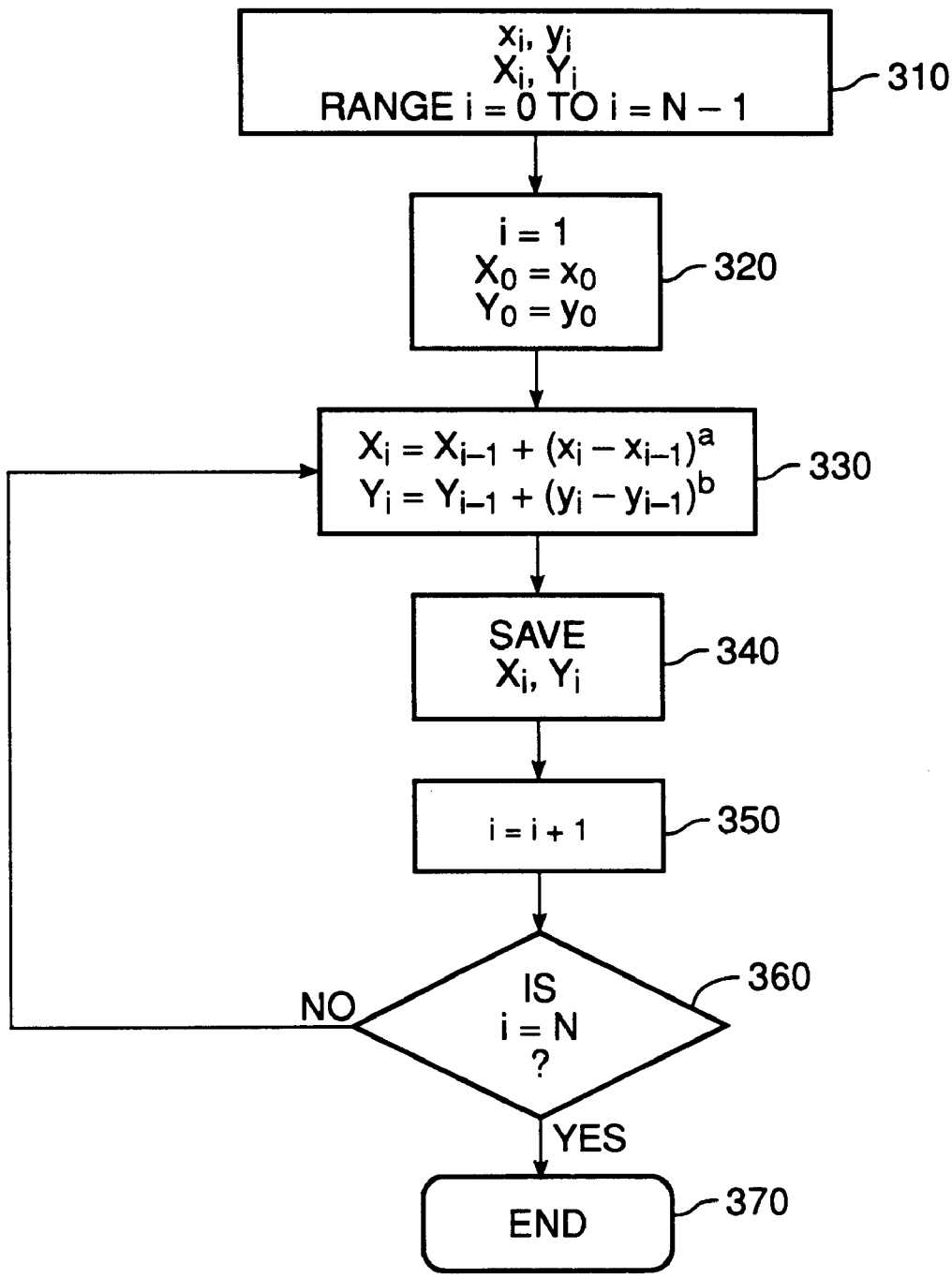
FIG. 3 illustrates a specific embodiment of the invention.

FIG. 3 illustrates a specific embodiment of the invention. The digitizer data is in the form of a sequence of coordinate values, $x_i$ and $y_i$, as a function of time (step 310). The corresponding values of the dynamic reconstruction are $X_i$ and $Y_i$. The subscript i varies from i equal to 0 to i equal to the number of data points minus one (N−1). The program is initialized by setting i equal to 1, $X_0$ equal to $x_0$, and $Y_0$ equal to $y_0$ (step 320).

The values for the dynamic reconstruction are created by accumulating increments that are a function of the original data (step 330). In this embodiment the reconstructed value, $X_i$, is equal to the value of the previous reconstructed data point, $X_{i-1}$, plus the difference between original data points $x_i$ and $x_{i-1}$, raised to the power a. Likewise, the reconstructed value, $Y_i$, is equal to the value of the previous reconstructed data point, $Y_{i-1}$, plus the difference between original data points $y_i$ and $y_{i-1}$, raised to the power b.

After determining the dynamically reconstructed data (step 330), the reconstructed data point is saved (step 340), the value of i is incremented by one (step 350), and a determination is made as to whether or not all data points have been dynamically reconstructed (step 360). If all of the data points have been reconstructed then this program ends (step 370); otherwise the program loops back to reconstruct the next data point.

Figure 4:
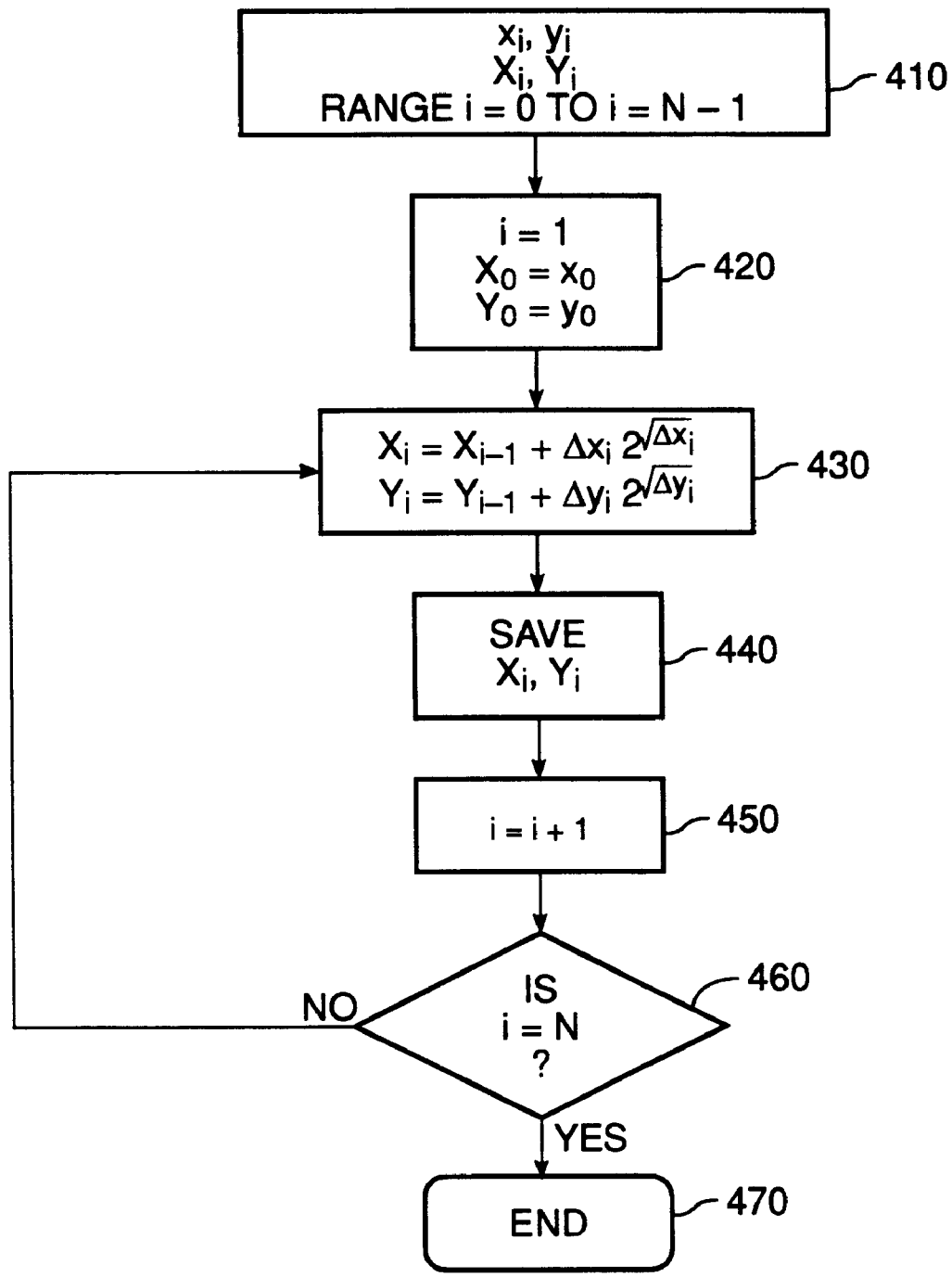
FIG. 4 illustrates a second embodiment of the invention.

FIG. 4 illustrates a second embodiment of the invention. The digitizer data is in the form of a sequence of coordinate values, $x_i$ and $y_i$, as a function of time (step 410). The corresponding values of the dynamic reconstruction are $X_i$ and $Y_i$. The subscript i varies from i equal to 0 to i equal to the number of data points minus one (N−1). The program is initialized by setting i equal to 1, $X_0$ equal to $x_0$, and $Y_0$ equal to $y_0$ (step 420).

The values for the dynamic reconstruction are created by accumulating increments that are a function of the original data (step 430). $\Delta x_i$ is defined as the difference between $x_i$ and $x_{i-1}$ and $\Delta y_i$ is defined as the difference between $y_i$ and $y_{i-1}$. In this embodiment the reconstructed value, $X_i$, is equal to the value of the previous reconstructed data point, $X_{i-1}$, plus $\Delta x_i$ times the value equivalent to 2 raised to the power of the square root of $\Delta x_i$. Likewise, the reconstructed value, $Y_i$, is equal to the value of the previous reconstructed data point, $Y_{i-1}$, plus $\Delta y_i$ times the value equivalent to 2 raised to the power of the square root of $\Delta y_i$.

After determining the dynamically reconstructed data (step 430), the reconstructed data point is saved (step 440), the value of i is incremented by one (step 450), and a determination is made as to whether or not all data points have been dynamically reconstructed (step 460). If all of the data points have been reconstructed then this program ends (step 470); otherwise the program loops back to reconstruct the next data point.

Figure 5:
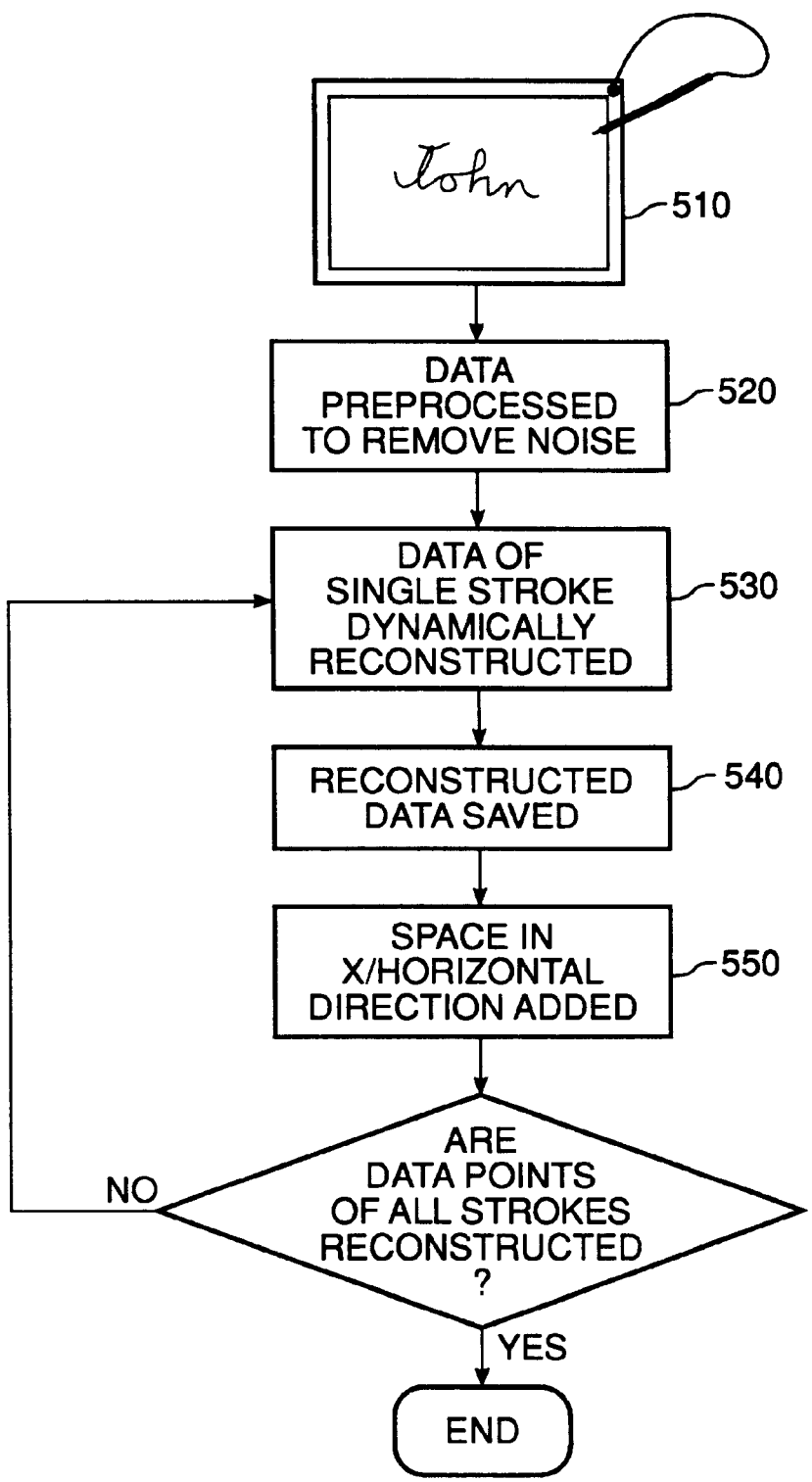
FIG. 5 shows a flow chart of another embodiment of the invention.

FIG. 5 is a flow chart of a third embodiment of the invention. Data is input by writing on a digitizer tablet (step 510). Prior to dynamic reconstruction of the data, the data is preprocessed (step 520). Next a mathematical function is applied to each data point, the function enhancing the dynamics associated with the generation of the data (step 530). The dynamically reconstructed data points are then saved (step 540) for later comparison. After a stream of data representing a single stroke has been reconstructed, a space in the x or horizontal direction is added into the sequence (step 550). The next sequence of data is then reconstructed, this process continuing until all data points accounting for all strokes have been reconstructed.

Figure 6A:
FIGS. 6A–C illustrate the reconstruction method.
Figure 6B:
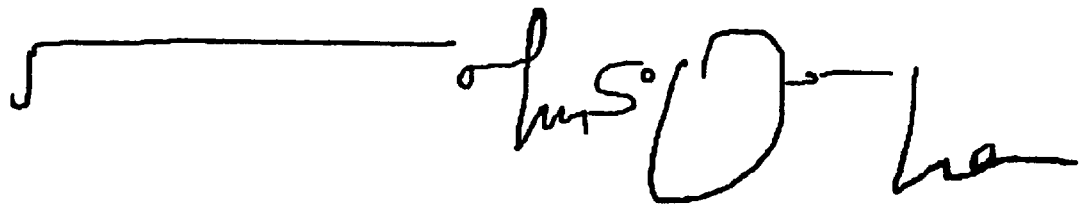

FIG. 6 illustrates the reconstruction method. FIG. 6A is an original signature. FIG. 6B is the reconstruction of this signature, given by:

$$X_i = X_{i-1} + (x_i - x_{i-1})^a,$$

and $$Y_i = Y_{i-1} + (y_i - y_{i-1})^b$$

where $x_i$ and $y_i$ over the range i=0 to i=N−1 is the discrete representation of a stroke, $X_i$ and $Y_i$ over the range i=0 to i=N−1 is the discrete representation of a dynamic reconstruction of a stroke, a is equal to 2, b is equal to 2, and N is the number of points.

Figure 6C:
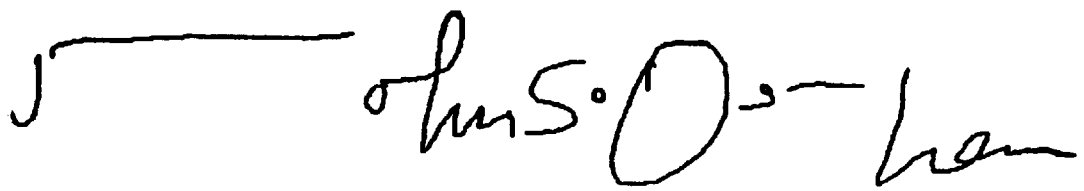

FIG. 6C is the reconstruction of the same signature applying the same equations. However, in this reconstruction both a and b are set equal to 1.5 instead of 2. Note that the higher the value of a and b, the greater the dynamic enhancement.

Figures 7A, 7B:
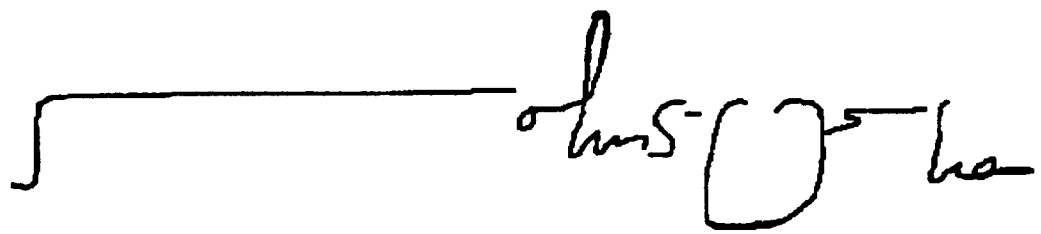
FIGS. 7A–B illustrate a second embodiment of the reconstruction method.

FIG. 7 illustrates the reconstruction method applying a different function. FIG. 7A is an original signature. FIG. 7B is the reconstruction of this signature, given by:

$$X_i = X_{i-1} + \Delta x_i \, 2^{(\Delta x i)^{1/2}},$$

and $$Y_i = Y_{i-1} + \Delta x_i \, 2^{(\Delta y i)^{1/2}}$$

where $x_i$ and $y_i$ over the range i=0 to i=N−1 is the discrete representation of a stroke, $X_i$ and $Y_i$ over the range i=0 to i=N−1 is the discrete representation of a dynamic reconstruction of a stroke, $\Delta x_i$ is equal to $x_i - x_{i-1}$, $\Delta y_i$ is equal to $y_i - y_{i-1}$, and N is the number of points.

FIG. 8 illustrates a further advantage of dynamic reconstruction; the ability to determine stroke sequence. FIG. 8A is an original signature. FIG. 8B is the reconstruction of this signature, given by:

$$X_i = X_{i-1} + (x_i - x_{i-1})^2,$$

and $$Y_i = Y_{i-1} + (y_i - y_{i-1})^2$$

where $x_i$ and $y_i$ over the range i=0 to i=N−1 is the discrete representation of a stroke, $X_i$ and $Y_i$ over the range i=0 to i=N−1 is the discrete representation of a dynamic reconstruction of a stroke, and N is the number of points.

Figure 8A:
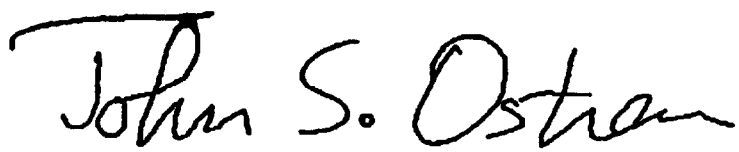
FIGS. 8A–D illustrate the ability to determine stroke sequence using the dynamic reconstruction of handwritten data.
Figure 8B:
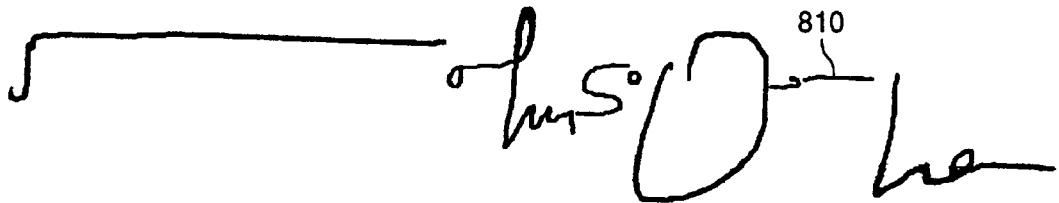
Figure 8C:
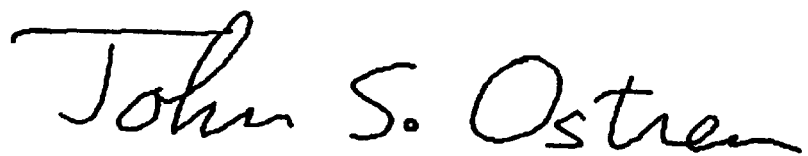
Figure 8D:
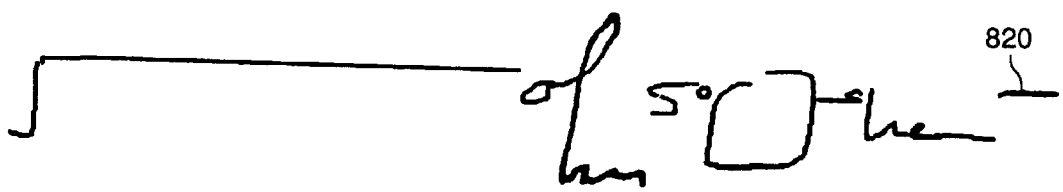

FIG. 8C is a second original signature, however the sequence of strokes has been changed so that the crossing of the "t" in Ostrem is the last stroke. Applying the same reconstruction of this signature, shown in FIG. 8D, illustrates the differences due to stroke sequence. Stroke 810 represents the crossing of the "t" in the first sequence, while stroke 820 represents the crossing of the "t" in the second sequence.

The Appendix attached hereto and forming an integral part of this application contain the source code for computer program modules used to dynamically reconstruct the data of a specimen signature.

This invention has now been explained with reference to specific embodiments. Other embodiments will be apparent to those of ordinary skill in the art in light of this disclosure. It is therefore not intended that this invention be limited except as indicated by the appended claims.

APPENDIX

SOURCE CODE FOR DYNAMIC RECONSTRUCTION
(Copyright © 1992 Communication Intelligence Corporation)

```
for (k = 0; k < numsegs; ++k)
{
    x2[segpnt[k]] = x[segpnt[k]];
    y2[segpnt[k]] = y[segpnt[k]];
    for (m = segpnt[k] + 1; m < segpnt[k + 1]; ++m)
    {
        if (x[m] < x[m - 1])
        {
            increment = (x[m] - x[m - 1]);
            increment = -increment * increment;
        }
        else
        {
            increment = (x[m] - x[m - 1]);
            increment = increment * increment;
        }
        x2[m] = x2[m - 1] + increment;
        if (y[m] < y[m - 1])
        {
            increment = (y[m] - y[m - 1]);
            increment = -increment * increment;
        }
        else
        {
            increment = (y[m] - y[m - 1]);
            increment = increment * increment;
        }
        y2[m] = y2[m - 1] + increment;
    }
}
``` where x[],y[] represents the original data, and x2[], y2[] the dynamic reconstruction.

"numsegs" gives the number of strokes in the signature, and segpnt[] contains the starting indices of the individual strokes in the signature.

Thus, the outer loop (over variable k) is over the number of strokes in the signature, and the inner loop (over the index m) is over the points within a single stroke.

The strokes in the signature are spaced out so that overlapping in the x (horizontal) direction does not occur.

The code to add offsets to space out the stokes is

```
for (k=0; k<numsegs; ++k)
{
    x2min = x2[segpnt[k]];
    x2max = x2[segpnt[k]];
    for (m = segpnt[k] + 1; m < segpnt[k + 1]; ++m)
```

-continued

```
    {
    if (x2[m] < x2min)
        x2min = x2[m];
    else if (x2[m] > x2max)
        x2max = x2[m];
    }
    offset_x = 0;
    offset_y = 0;
    if (k > 0)
    {
        offset_x = x2max_last + 25 - x2min;
        offset_y = 0;
    }
    for (m = segpnt[k] ; m < segpnt[k + 1] ; ++m)
    {
        x2[m] += offset_x;
        y2[m] += offset_y;
    }
    x2max_last = x2max + offset_x;
}
```

What is claimed is:

1. A method for authenticating handwritten data using a computer, the computer comprising a processor, a memory, and a digitizer tablet, the method comprising:

capturing a stroke of the handwritten data as a first sequence of data points as a function of time, in response to a physical movement of a pen on the digitizer tablet, the data points in the first sequence having positional coordinates;

forming a second sequence of data points by determining positional coordinates of a previous data point in the second sequence of data points and the spatial differences between adjacent data points in the first sequence according to the following relationship:

$$X_i = X_{i-1} + (x_i - x_{i-1})^a,$$

$$Y_i = Y_{i-1} + (y_i - y_{i-1})^b,$$

where $x_i$ and $x_{i-1}$ over the range i=0 to i=N−1 are positional coordinates of data points in the first sequence of data points, $y_i$ and $y_{i-1}$ over the range i=0 to i=N−1 are positional coordinates of data points in the first sequence of data points, $X_{i-1}$ and $Y_{i-1}$ over the range i=0 to i=N−1 are the positional coordinates of the previous data points in the second sequence of data points, $X_i$ and $Y_i$ over the range i=0 to i=N−1 are the positional coordinates of the data points in the second sequence of data points, a is any real number excluding −1, 0, or 1, b is any real number excluding −1, 0, or 1, and N is a number of positional data points in the first sequence; and authenticating the handwritten data on the basis of the second sequence of data points.

2. A method for comparing a stroke of an unverified handwriting sample to a stroke of a verified handwriting sample comprising:

capturing a parametric representation of the stroke of the unverified handwriting sample produced by a physical movement of a pen on a digitizer tablet as a first sequence of positional data points as a function of time;

determining the spatial differences between adjacent positional data points of the first sequence;

constructing the stroke of the unverified handwriting sample as a second sequence of positional data points in response to the spatial differences between adjacent positional data points of the first sequence, according to the following relationship:

$$X_i = X_{i-1} + (x_i - x_{i-1})^a,$$

$$Y_i = Y_{i-1} + (y_i - y_{i-1})^b,$$

where $x_i - x_{i-1}$ and $y_i - y_{i-1}$ over the range i=0 to i=N−1 are the spatial differences between positional data points in the first sequence, $X_i$ and $Y_i$ over the range i=0 to i=N−1 are positional data points in the second sequence, a is any real number excluding −1, 0, or 1, b is any real number excluding −1, 0, or 1, and N is a number of positional data points in the first sequence; and comparing the constructed stroke of the unverified handwriting sample with a constructed stroke of the verified handwriting sample.

3. A method for authentication using a computer to dynamically reconstruct a representation of handwritten data as a dynamic reconstruction, the computer comprising a processor, a memory, and a digitizer tablet, the method comprising:

capturing handwritten data produced by a physical movement of a pen on the digitizer tablet, and using the processor to create a parametric representation of the handwritten data as a first sequence of positional data points as a function of time;

enhancing dimensional components of the parametric representation with temporal components of the parametric representation to produce the dynamic reconstruction in the form of a second sequence of positional data points according to the following relationship:

$$X_i = X_{i-1} + (x_i - x_{i-1})^a,$$

$$Y_i = Y_{i-1} + (y_i - y_{i-1})^b,$$

where $x_i$ and $y_i$ over the range i=0 to i=N−1 is a discrete representation of a stroke, $X_i$ and $Y_i$ over the range i=0 to i=N−1 is a discrete representation of the dynamic reconstruction of the stroke, a is any real number excluding −1, 0, or 1, b is any real number excluding −1, 0, or 1, and N is a number of points in the stroke; and authenticating the handwritten data on the basis of the dynamic reconstruction of the handwriting data.

4. A method for comparing an unverified handwriting sample to a verified handwriting sample comprising:

capturing a parametric representation of the unverified handwriting sample produced by a physical movement of a pen on a digitizer tablet as a first sequence of positional data points as a function of time;

computing the linear distances between adjacent data points of the first sequence;

creating the unverified handwriting sample as a second sequence of positional data points from the first sequence of positional data points according to the following relationship:

$$X_i = X_{i-1} + (x_i - x_{i-1})^a,$$
$$Y_i = Y_{i-1} + (y_i - y_{i-1})^b,$$

where $x_i - x_{i-1}$ and $y_i - y_{i-1}$ over the range i=0 to i=N−1 are the linear distances between positional data points in the first sequence, $X_i$ and $Y_i$ over the range i=0 to i=N−1 is the second sequence of the positional data points, a is any real number excluding −1, 0, or 1, b is any real number excluding −1, 0, or 1, and N is a number of points in the stroke; and comparing the created unverified handwriting sample with a created verified handwriting sample.

5. A computer program product for authenticating handwritten data, the computer program product comprising:

a computer-readable memory including:

code that captures a stroke of the handwritten data as a first sequence of data points as a function of time, in response to a physical movement of a pen on the digitizer tablet, the data points in the first sequence having positional coordinates;

code that forms a second sequence of data points by determining positional coordinates of a previous data point in the second sequence of data points and the spatial differences between adjacent data points in the first sequence according to the following relationship:

$$X_i = X_{i-1} + (x_i - x_{i-1})^a,$$
$$Y_i = Y_{i-1} + (y_i - y_{i-1})^b,$$

where $x_i$ and $x_{i-1}$ over the range i=0 to i=N−1 are positional coordinates of data points in the first sequence of data points, $y_i$ and $y_{i-1}$ over the range i=0 to i=N−1 are positional coordinates of data points in the first sequence of data points, $X_{i-1}$ and $Y_{i-1}$ over the range i=0 to i=N−1 are the positional coordinates of the previous data points in the second sequence of data points, $X_i$ and $Y_i$ over the range i=0 to i=N−1 are the positional coordinates of the data points in the second sequence of data points, a is any real number excluding −1, 0, or 1, b is any real number excluding −1, 0, or 1, and N is a number of positional data points in the first sequence; and code that authenticates the handwritten data on the basis of the second sequence of data points.

6. A computer program product for comparing a stroke of an unverified handwriting sample to a stroke of a verified handwriting sample comprising:

a computer-readable memory including:

code that directs a processor to capture a parametric representation of the stroke of the unverified handwriting sample, produced by a physical movement of a pen on a digitizer tablet, as a first sequence of positional data points as a function of time;

code that directs the processor to apply a process to positional data points of the first sequence to obtain a dynamic reconstruction of the stroke of the unverified handwriting sample as a second sequence of positional data points according to the following relationship:

$$X_i = X_{i-1} + (x_i - x_{i-1})^a,$$
$$Y_i = Y_{i-1} + (y_i - y_{i-1})^b,$$

where $x_i$ and $y_i$ over the range i=0 to i=N−1 are positional data points in the first sequence, $X_i$ and $Y_i$ over the range i=0 to i=N−1 are positional data points in the second sequence, a is any real number excluding −1, 0, or 1, b is any real number excluding −1, 0, or 1, and N is a number of positional data points in the stroke; and code that directs the processor to compare the dynamic reconstruction of the stroke of the unverified handwriting sample with a dynamic reconstruction of the stroke of the verified handwriting sample.

7. A computer system for comparing a stroke of an unverified handwriting sample to a stroke of a verified handwriting sample, the computer system including a digitizer tablet, the computer system further comprising:

a memory for capturing the unverified handwriting sample produced by a physical movement of a pen on the digitizer tablet; and a processor for creating a parametric representation of a stroke of the unverified handwriting sample as a first sequence of positional data points as a function of time, for computing the linear distances between adjacent data points of the first sequence, for enhancing dimensional components of the parametric representation with temporal components of the parametric representation to produce a dynamic reconstruction of the stroke of the unverified handwriting sample in the form of a second sequence of positional data points according to the following relationship:

$$X_i = X_{i-1} + (x_i - x_{i-1})^a,$$
$$Y_i = Y_{i-1} + (y_i - y_{i-1})^b,$$

where $x_i$ and $y_i$ over the range i=0 to i=N−1 are positional data points in the first sequence, $X_i$ and $Y_i$ over the range i=0 to i=N−1 are positional data points in the second sequence, a is any real number excluding −1, 0, or 1, b is any real number excluding −1, 0, or 1, and N is a number of positional data points in the first sequence, and for comparing the dynamic reconstruction of the stroke of the unverified handwriting sample with a dynamic reconstruction of a stroke of the verified handwriting sample.

8. A method of authenticating handwritten data using a computer, the computer having a processor, a memory, and a digitizer tablet, the method comprising:

capturing a stroke of the handwritten data as a first sequence of data points as a function of time, said capturing being performed in response to a physical movement of a pen on the digitizer tablet, the data points in the first sequence having positional coordinates;

generating a second sequence of data points based on the linear distances between the data points in the first sequence such that the second sequence of data points is altered along substantially the same direction as defined by the first sequence of data points; and authenticating the handwritten data on the basis of the second sequence of data points.

9. A method of authenticating handwritten data using a computer, the computer having a processor, a memory, and a digitizer tablet, the method comprising:

capturing a stroke of the handwritten data as a first pair of data points as a function of time, said capturing being performed in response to a physical movement of an input device on the digitizer tablet, the first pair of data points having positional coordinates;

calculating a linear distance between the first pair of data points;

generating a second pair of data points from the first pair of data points by increasing or decreasing the linear distance between the first pair of data points to generate the second pair of data points along substantially the same direction as the first pair of data points; and authenticating the handwritten data on the basis of the second pair of data points.

10. The method according to claim 1 wherein the first sequence of data points from the digitizer tablet is a sequence of x and y positional coordinate values in a Cartesian coordinate system.

11. The method according to claim 1, further comprising the step of spacing out individual strokes of a dynamic reconstruction of strokes.

12. The method according to claim 2 wherein the first sequence of data points is a sequence of x and y coordinate values in a Cartesian coordinate system.

13. The method according to claim 2, further comprising the step of spacing out individual strokes of the dynamic reconstruction.

14. The method of claim 8 wherein the second sequence of data points is altered by increasing the linear distances between the data points in the second sequence.

15. The method of claim 8 wherein the second sequence of data points is altered by decreasing the linear distances between the data points in the second sequence.

16. The method of claim 9 wherein authenticating the handwritten data includes displaying the second pair of data points.

17. The method of claim 9 wherein authenticating the handwritten data includes comparing the second pair of data points with a reference pair of data points.

* * * * *